United States Patent
Miyamoto et al.

(10) Patent No.: US 6,904,291 B2
(45) Date of Patent: Jun. 7, 2005

(54) POWER CONTROL DEVICE AND POWER CONTROL METHOD FOR RADIO COMMUNICATION

(75) Inventors: Shoiti Miyamoto, Kawasaki (JP); Yasuhira Itajiki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 603 days.

(21) Appl. No.: 09/970,019

(22) Filed: Oct. 2, 2001

(65) Prior Publication Data

US 2002/0198014 A1 Dec. 26, 2002

(30) Foreign Application Priority Data

Jun. 21, 2001 (JP) ........................................ 2001-188673

(51) Int. Cl.$^7$ .............................. H04B 7/00; H04Q 7/20
(52) U.S. Cl. ........................ 455/522; 455/423; 455/424; 455/115.1; 455/115.3
(58) Field of Search ........................... 455/226.1–226.4, 455/423–425, 522, 67.7, 69, 115.1–115.4

(56) References Cited

U.S. PATENT DOCUMENTS 6,337,975 B1 * 1/2002 Coan et al. ................ 455/129
6,763,483 B2 * 7/2004 Penick et al. ................ 714/39

FOREIGN PATENT DOCUMENTS

| JP | 11-275639 | 10/1999 |
| JP | 2000-196566 | 7/2000 |
| WO | WO 96/03813 | 2/1996 |

* cited by examiner

Primary Examiner—Duc Nguyen
(74) Attorney, Agent, or Firm—Katten Muchin Zavis Rosenman

(57) ABSTRACT

The present invention provides a power control device for controlling the transmission power of a signal transmitted between a mobile station and a base station in a mobile communication system via a radio channel. The device has an error judgment unit for receiving communication data transmitted in each communication unit having a fixed length via the radio channel, and judging whether or not said communication data has an error in each communication unit; and a target power control unit for measuring in each predetermined measurement period the number N of said received communication units and the number M of communication units which are judged as error by said error judgment unit, and changing said target power value based on a criterion value and said number M, or said criterion value and said numbers N and M, said criterion value being a criterion of change of said target power value and being determined according to said number N.

18 Claims, 8 Drawing Sheets

FIG. 3A

| Received frame number N | NG threshold value |
|---|---|
| $0 < N \leq N1$ | Th1 |
| $N1 < N \leq N2$ | Th2 |
| $N2 < N \leq N3$ | Th3 |
| ⋮ | ⋮ |

FIG. 3B

| Received frame number N | NG threshold value |
|---|---|
| $0 < N \leq 20$ | 1 |
| $20 < N \leq 40$ | 2 |
| $40 < N \leq 60$ | 3 |
| $60 < N \leq 80$ | 4 |
| $80 < N \leq 100$ | 5 |

FIG. 5

| FER measurement unit for Fch | FER measurement unit for Sch | Change of target power threshold value |
|---|---|---|
| Increase | Increase | Increase |
| Increase | Decrease | |
| Decrease | Increase | |
| Decrease | Decrease | Decrease |

FIG. 7A

| Received frame number N | Target FER value |
|---|---|
| 0 < N ≦ N1 | R1 |
| N1 < N ≦ N2 | R2 |
| N2 < N ≦ N3 | R3 |
| ⋮ | ⋮ |

FIG. 7B

| Received frame number N | Target FER value |
|---|---|
| 0 < N ≦ 20 | 5% |
| 20 < N ≦ 40 | 4% |
| 40 < N ≦ 60 | 3% |
| 60 < N ≦ 80 | 2% |
| 80 < N ≦ 100 | 1% |

FIG. 8A

| Received frame number N | NG frame number M (NG threshold value) | UP/DOWN amount |
|---|---|---|
| 0<N≦N1 | M≦M11 | A |
| | M11<M≦M12 | B |
| | M12<M≦M13 | C |
| | M13<M | D |
| N1<N≦N2 | M≦M21 | A |
| | M21<M≦M22 | B |
| | M22<M≦M23 | C |
| | M23<M | D |
| ⋮ | ⋮ | ⋮ |

FIG. 8B

| Received frame number N | NG frame number M (NG threshold value) | UP/DOWN amount |
|---|---|---|
| 0<N≦20 | M≦1 | Down small |
| | 1<M≦4 | Up small |
| | 4<M | Up large |
| 20<N≦40 | M≦2 | Down small |
| | 2<M≦5 | Up small |
| | 5<M | Up large |
| 40<N≦60 | M≦3 | Down small |
| | 3<M≦6 | Up small |
| | 6<M | Up large |
| 60<N≦80 | M≦1 | Down large |
| | 1<M≦4 | Down small |
| | 4<M≦7 | Up small |
| | 7<M | Up large |
| 80<N≦100 | M≦2 | Down large |
| | 2<M≦5 | Down small |
| | 5<M≦8 | Up small |
| | 8<M | Up large |

POWER CONTROL DEVICE AND POWER CONTROL METHOD FOR RADIO COMMUNICATION

BACKGROUND OF THE INVENTION

1. Field of the Invention

The present invention relates to a power control device and a power control method for controlling the transmission power of a signal to be transmitted between a mobile station and a base station in a mobile communication system via a radio channel, and more particularly to a power control device and a power control method for controlling the transmission power by adjusting a target power value to be the target of the transmission power of signals which are transmitted via a radio channel which is set between a mobile station and a base station which communicates with the mobile station.

2. Description of the Related Art

As a Code Division Multiple Access (CDMA) type mobile communication system, a cdmaOne type mobile communication system has been commercialized, and a cdma2000 type mobile communication system which uses a broader bandwidth will be commercialized in the near future.

In a CDMA system, since a plurality of mobile stations (e.g. cellular phones, car phones) use a same frequency band, the interference power between mobile stations must be decreased in order to increase the number of multiple mobile stations. To achieve this, power control for controlling the transmission power of a mobile station to an optimum value is performed.

There are two types of power control: closed loop power control and outer loop power control.

Closed loop power control controls the transmission power of a mobile station by a base station, which measures the transmission power of a pilot channel or fundamental channel transmitted from a mobile station, and compares the transmission power and a predetermined target power threshold value (target power value) so that the transmission power becomes or approaches the target power threshold value. From the base station to the mobile station, power control bits are transmitted to instruct an increase/decrease of the transmission power, and the mobile station increases/decreases the transmission power according to the transmitted power control bits.

Outer loop power control, on the other hand, changes (adjusts the increase/decrease of) the target power threshold value by the base station or by the base station control device, which calculates the error rate (FER: Frame Error Rate) of frames transmitted from a mobile station via a fundamental channel, and compares this calculated FER with a predetermined target FER value (fixed value) so that FER becomes or approaches the target FER value. When the target power threshold value is changed, closed loop power control is performed based on the changed target power threshold value.

The fundamental channel generally carries call voice data, which is continuous data. Therefore, on the fundamental channel, a communication unit with a predetermined length, referred to as a frame, is always generated, and data is transmitted in frame units. Even in a silent state, frames to carry minimum-rate data (silent data) are generated and transmitted on the fundamental channel. In the cdmaOne system, for example, frames having time length of 20 [msec] are continuously generated on the fundamental channel.

Therefore, in the case of conventional outer loop power control, N=100 (=2 [sec]÷20 [msec]) frame units are received in a predetermined measurement period T=2 [sec] units, for example, and the number M of frames, which have frame errors included in the received frames, is counted. Then FER is calculated by determining FER=M÷N. And by comparing the calculated FER with a target FER value, which is set to 1%, for example, the change of the target power threshold value is controlled.

In this way, conventional outer loop power control is performed based on the fact that frames are always generated on a channel, and the number of frames to be received within a predetermined measurement period T is always constant.

However, in the case of a channel to carry data which is not transmitted continuously, such as packet data, frames need not be generated all the time on a channel, and it is efficient to generate frames only when data is transmitted. In the cdma2000 system, for example, a supplemental channel is disposed as a channel to transmit such discrete data as packet data, and in the supplemental channel frames are generated only when data is transmitted.

In such a case, if conventional outer loop power control is used, the accuracy of control may deteriorate, or control may substantially malfunction.

In other words, in order to implement a 1% accuracy when the target FER value is 1%, for example, at least 100 frames must be received to calculate FER. In the case of a supplemental channel, however, 100 frames are not always received within the measurement period T=2 [sec]. If FER is calculated with less than 100 frames and the result is compared with the target FER in this case, accuracy of control deteriorates.

Also when it takes several minutes or several tens of minutes to receive 100 frames, for example, outer loop power control does not function during this time. Also, 100 frames may not be received by the end of communication of a mobile station, and in this case outer loop power control is not performed.

SUMMARY OF THE INVENTION

With the foregoing in view, it is an object of the present invention to appropriately perform control of the transmission power even for a channel used for transmitting such discrete data as packet data.

To achieve the above object, the first aspect of the present invention is a power control device for controlling transmission power of a signal to be transmitted via a radio channel which is set between a mobile station and a base station which communicates with the mobile station by adjusting a target power value to be a target of said transmission power, comprising: an error judgment unit for receiving communication data transmitted in each communication unit having a fixed length via the radio channel, and judging whether or not said communication data has an error in each communication unit; and a target power control unit for measuring in each predetermined measurement period the number N of said received communication units and the number M of communication units which are judged as error by said error judgment unit, and changing said target power value based on a criterion value and said number M, or said criterion value and said numbers N and M, said criterion value being a criterion of change of said target power value and being determined according to said number N.

According to the first aspect of the present invention, communication data to be transmitted in each communication unit having a fixed length on the radio channel is received, and it is judged whether or not the communication data has an error in each communication unit. And the number N of the received communication units and the number M of the communication units which are judged as having an error by the error judgment unit are measured in each predetermined measurement period. And the target power value is changed based on the criterion value and the number M, or the criterion value and the numbers N and M. The criterion value is the criterion of change of the target power value, and is determined according to the number N, According to the first aspect of the present invention, the criterion value to be the criterion of change of the target power value is determined according to the number N of the received communication units. Therefore, even when the communication unit to be received changes depending on the measurement period, such as the communication channel for transmitting such discrete data as packet data, power control according to the number N can be performed. Also by setting the criterion value to an appropriate value according to the number N, transmission power can be appropriately controlled even if the number N changes.

The second aspect of the present invention is a power control device for controlling transmission power of a signal to be transmitted via a radio channel which is set between a mobile station and a base station which communicates with said mobile station by adjusting a target power value to be the target of said transmission power, comprising: an error judgment unit for receiving communication data transmitted in each communication unit having a fixed length on said radio channel, and judging whether or not said communication data has an error in each communication unit; and a target power control unit for measuring the number of communication units judged as error by said error judgment unit in each measurement period, and controlling said target power value to increase when said number is one or more and to decrease when said number is 0, said measurement period being defined as a value obtained by dividing a value of the length of said communication unit represented by time by a target error rate, said target error rate indicating a target value of a ratio of the communication units judged as error by said error judgment unit out of the received communication units.

According to the second aspect of the present invention, the measurement period can be decreased according to the target error rate. Therefore, the time interval of the power control (change of target power value) can be decreased, and as a result, the change of transmission power can be quickly handled, and the speed of response of the power control can be increased.

The third aspect of the present invention is a power control device for controlling transmission power of a signal to be transmitted via a radio channel which is set between a mobile station and a base station which communicates with the mobile station by adjusting a target power value to be a target of said transmission power, comprising: a first error judgment unit for receiving communication data on a first radio channel where communication units having a fixed length are continuously generated and transmitted on the channel after setting the channel, and judging whether or not said communication data has an error for each communication unit; a second error judgment unit for receiving communication data on a second radio channel where communication units having said fixed length are generated and transmitted on the channel when there is communication data after setting the channel, and judging whether or not said communication data has an error in each communication unit; a first change instruction unit for measuring the number M1 of communication units judged as error by the first error judgment unit in each predetermined measurement period, and generating an instruction to change said target power value based on the number M1 and a predetermined first criterion value to be the criterion of changing said target power value; a second change instruction unit for measuring the number N2 of communication units received via said second channel and the number M2 of communication units which are judged as error by said second error judgment unit in each measurement period, and generating an instruction to change said target power value based on a second criterion value and the number M2, or said second value and the number N2 and M2, said second criterion value being a criterion of changing said target power value and being determined according to the number N2; and a target power setting unit for changing said target power based on the instruction of said first change instruction unit and the instruction of said second change instruction unit.

According to the third aspect of the present invention, the second criterion value to be the criterion of the change of the target power value is determined according to the number N2 of the received communication units. Therefore, even when the communication units to be received change depending on the measurement period, power control according to the number N2 can be performed. Also, by setting the second criterion value to an appropriate value according to the number N2, the transmission power can be appropriately controlled even if the number N2 changes.

Here, the "radio channel" may be a channel from a mobile station to a base station, or a channel from a base station to a mobile station.

BRIEF DESCRIPTION OF THE DRAWINGS

FIGS. 3A and 3B show tables of the relationship between the received frame number N of and the NG threshold value;

FIG. 5 is a table showing an example of changing the target power threshold value $P_T$ based on the first method;

FIGS. 7A and 7B are tables showing the relationship between the received frame number N and the target FER value; and FIGS. 8A and 8B are tables showing the relationship of the received frame number N, NG threshold value, and the increase amount (UP amount) and decrease amount (DOWN amount) of the target power threshold value when two or three NG threshold values are set.

DESCRIPTION OF THE PREFERRED EMBODIMENTS

[First Embodiment]

System Configuration

Figure 1:
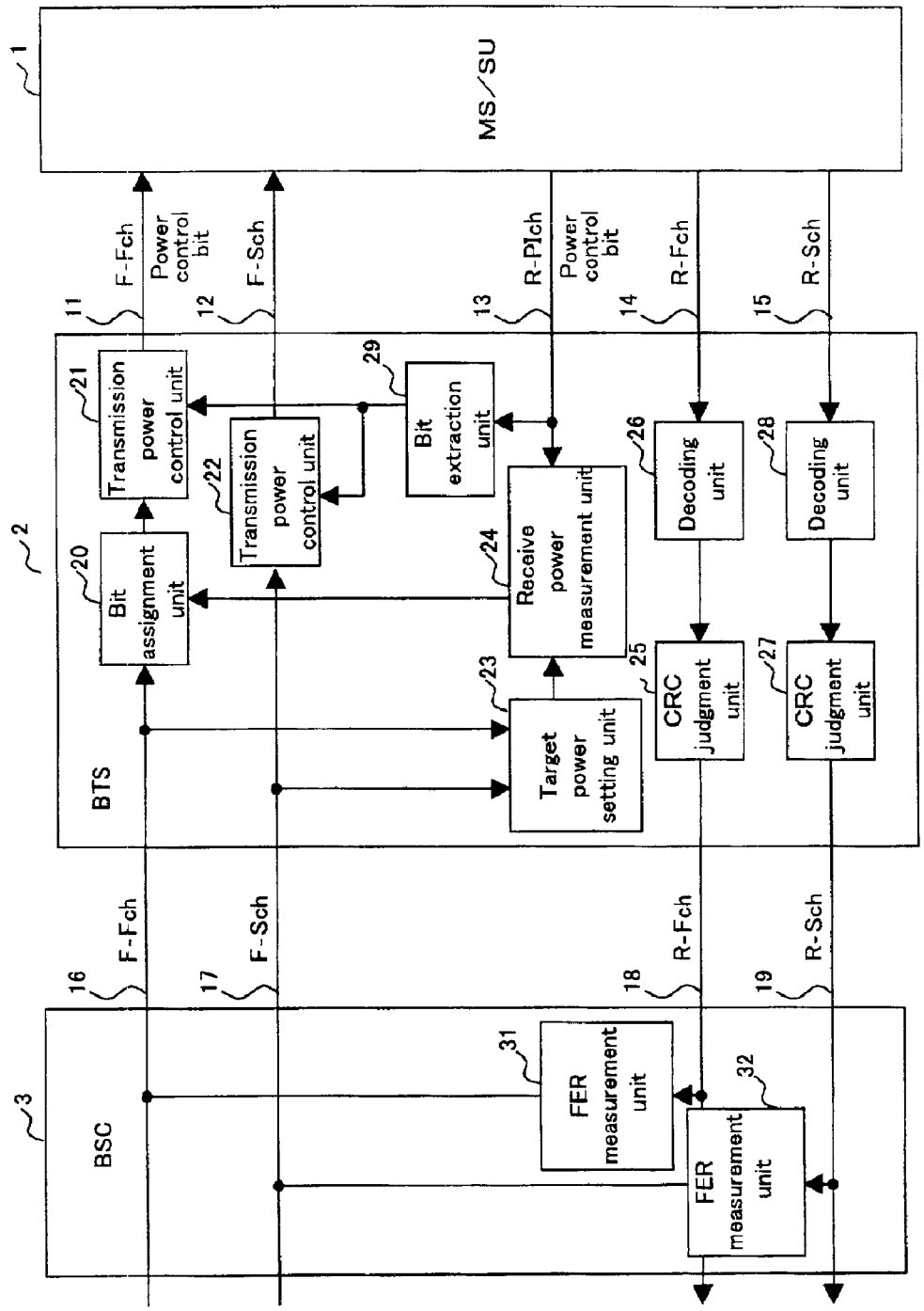
FIGS. 1 and 2 are block diagrams depicting a part of a mobile communication system according to the first embodiment of the present invention.
Figure 2:
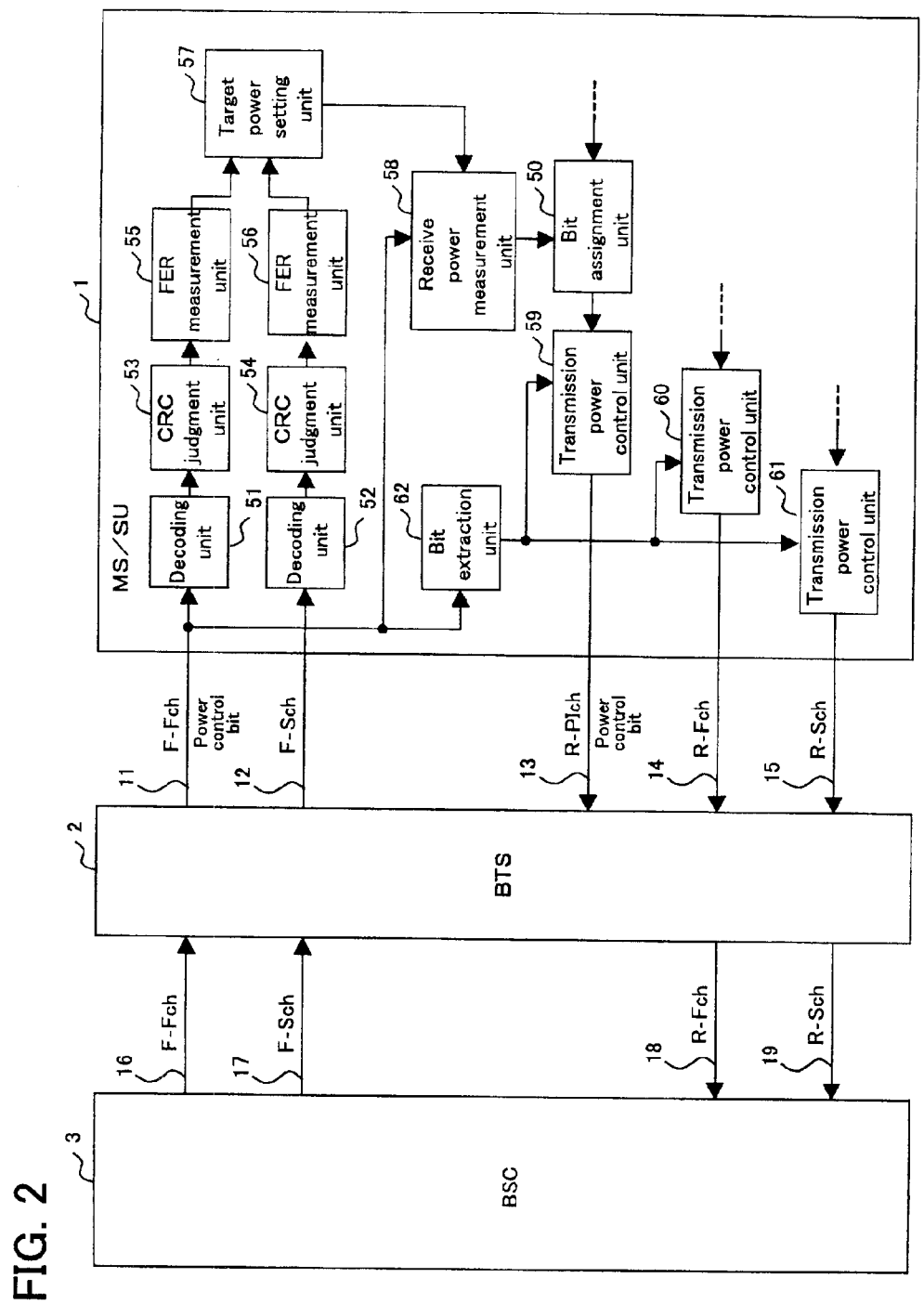

FIG. 1 and FIG. 2 are block diagrams depicting a part of a mobile communication system according to the first embodiment of the present invention, where a part of a cdma2000 type mobile communication system is shown as an example.

This mobile communication system has a mobile station/subscriber unit (MS/SU) 1, such as a cellular phone or a car telephone, a base station transceiver subsystem (BTS) 2, which communicates with MS/SU 1, and a base station controller (BSC) 3, which controls BTS 2. FIG. 1 is a block diagram depicting details of BTS 2 and BSC 3, and FIG. 2 is a block diagram depicting details of MS/SU 1.

Between MS/SU 1 and BTS 2, a channel in a reverse (up) direction channel from MS/SU 1 to BTS 2 and a forward (down) direction channel from BTS 2 to MS/SU 1 are set as radio channels.

The reverse direction channel includes a reverse fundamental channel (R-Fch) 14, a reverse supplemental channel (R-Sch) 15, and a reverse pilot channel (R-PIch) 13.

The forward direction channel includes a forward fundamental channel (F-Fch) 11, and a forward supplemental channel (F-Sch) 12.

Both the reverse and forward direction channels include dedicated control channels (R-DCch and F-DCch), respectively, which is not shown in the diagrams.

The channel between BTS 2 and BSC 3, as well, includes R-Fch 18, R-Sch 19, F-Fch 16, F-Sch 17, and includes R-DCch and F-DCch, which are not shown in the diagrams.

The fundamental channel (Fch) is a relatively low-speed data channel (9.6 [kbps]), which is also disposed in a conventional cdmaOne type mobile communication system, and is used for communication of call-voice data or control data in a cdma2000 type mobile communication system. The supplemental channel (Sch) on the other hand, is a relatively high-speed data channel (9.6×n [kbps]: n=1, 2, 4, 8 . . . ), which is a new addition to the cdma2000 system, and is used for communication of such discrete data (user data) as packet data. The pilot channel is used for communication of pilot signals.

When Fch is set, frames always having a predetermined length L1 (e.g. 20 [msec] length) are provided for Fch as a communication unit, regardless the presence or absence of voice (or audio) data and control data, just like a conventional cdmaOne system. For Sch, on the other hand, one or more frames having a predetermined length L2 (normally L1=L2, a 20 [msec] length for example) are provided on the channel, and data is transmitted by this frame when data is transmitted, but when there is no transmission data, no frames are provided.

As FIG. 1 shows, BTS 2 has a bit assignment unit 20, transmission power control units 21 and 22, a target power setting unit 23, a receive power measurement unit 24, CRC judgment units 25 and 27, decoding units 26 and 28, and a bit extracting unit 29. BSC 3 has FER judgment units 31 and 32.

Looped power control from MS/SU 1 back to MS/SU 1 via R-PIch 13, receive power measurement unit 24, bit assignment unit 20 and F-Fch 11 is closed loop power control for controlling the transmission power of R-PIch 13, R-Fch 14 and R-Sch 15.

Looped power control for MS/SU 1 back to MS/SU 1 via R-Fch 14, R-Sch 15, decoding units 26 and 28, CRC judgment units 25 and 27, R-Fch 18, R-Sch 19, FER measurement units 31 and 32, target power setting unit 23, receive power measurement unit 24, bit assignment unit 20, and F-Fch 11 is outer loop power control for controlling the transmission power of R-PIch13, R-Fch 14 and R-Sch 15.

As FIG. 2 shows, MS/SU 1 has a bit assignment unit 50, decoding units 51 and 52, CRC judgment units 53 and 54, FER measurement units 55 and 56, target power setting unit 57, receive power measurement unit 58, transmission power control units 59, 60 and 61, and bit extraction unit 62.

Looped power control from BTS 2 back to BTS 2 via F-Fch 11, receive power measurement unit 58, bit assignment unit 50 and R-PIch 13 is closed loop power control for controlling the transmission power of F-Fch 11 and F-Sch 12.

Looped power control from BTS 2 back to BTS 2 via F-Fch 11, F-Sch 12, decoding units 51 and 52, CRC judgment units 53 and 54, FER measurement units 55 and 56, target power setting unit 57, receive power measurement unit 58, bit assignment unit 50 and R-PIch 13 is outer loop power control for controlling the transmission power of F-Fch 11 and F-Sch 12.

Now closed loop power control will be described, followed by a description of outer loop power control.

Closed Loop Power Control

This section describes closed loop power control of the transmission power of R-PIch 13, R-Fch 14 and R-Sch 15.

In the receive power measurement unit 24 of BTS 2, the target power threshold value (target power value, target Ec/I0) $P_T$ has been set in advance by the target power setting unit 23. This target power threshold value $P_T$ can be changed (adjusted) by the target power setting unit 23, and this change of the target power threshold value will be described later in the description of outer loop power control.

Pilot signals are input to the receive power measurement unit 24 from MS/SU 1 via R-PIch 13. The receive power measurement unit 24 measures the signal power P of the pilot signals which are input, and compares the measured signal power P and the target power threshold value $P_T$. The receive power of the pilot signals is measured because in a cdma2000 system, the signal power of R-PIch 13 is proportional to the signal power of R-Fch 14 and the signal power of R-Sch 15. And the signal power of R-Fch 14 and the signal power of R-Sch 15 can be known by measuring the signal power of R-PIch 13.

In the present embodiment, the signal power of R-PIch 13 is used since a cdma2000 system is used as an example, as described above, but for another system, it is also possible that R-Fch 14 or R-Sch 15 can be input to the receive power measurement unit 24, and the signal power which is input and the target power threshold value which is disposed for each one of these channels are compared to control the signal power.

If $P>P_T$ is the result of comparison, the receive power measurement unit 24 instructs the bit assignment unit 20 to assign a down bit to the data (user data) on F-Fch as a power control bit, and if $P<P_T$, the receive power measurement unit 24 instructs the bit assignment unit 20 to assign an up bit as a power control bit. If $P=P_T$, then these instructions are not given or an instruction not to assign any bit is given to the bit assignment unit 20.

Power control bit is one bit in cdma2000 system. In the case of P=Pt, the receive power measurement unit 24 may instruct the bit assignment unit 20 to assign an up bit or a down bit as a power control bit.

The bit assignment unit 20 assigns an up bit or a down bit to the data on F-Fch 11 according to the instruction from the receive power measurement unit 24, and transmits the data to MS/SU 1.

In MS/SU 1, the bit extraction unit 62 extracts the power control bit assigned to the data on F-Fch 11. And the extracted power control bit is transmitted to the transmission power control units 59, 60 and 61.

The transmission power control units 59, 60 and 61 decrease each of the transmission powers of R-PIch 13, R-Fch 14 and R-Sch 15 respectively for the preset amount of the decrease if the power control bit is a down bit, and if an up bit, each of the transmission power of R-PIch 13, R-Fch 14 and R-Sch 15 is increased respectively for the preset amount of the increase.

Closed loop power control is performed in this way, where each transmission power of R-PIch 13, R-Fch 14 and R-Sch 15 are controlled to be equal to the target power threshold value $P_T$, or to approach the target power threshold value $P_T$. This closed loop power control is executed 800 times per second, for example, in the cdma2000 system.

Closed loop (called "inner loop" in the case of forward direction channels) power control of the transmission powers of F-Fch 11 and F-Sch 12 is also performed by: the receive power measurement unit 58 which performs the same processing like as the receive power measurement unit 24, the bit assignment unit 50 which performs the same processing as the bit assignment unit 20, R-PIch 13 which carries the power control bit, the bit extraction unit 29 which performs the same processing as the bit extraction unit 62, and the transmission power control units 21 and 22 which perform the same processing as the transmission power control units 59, 60 and 61.

For the DCch as well, the same closed loop power control can be performed by providing a transmission power control unit for DCch and supplying a power control bit from the bit extraction unit 29 or 62 to the transmission power control unit.

Outer Loop Power Control

This section describes the outer loop power control of the transmission power of R-PIch 13, R-Fch 14 and R-Sch 15.

Data transmitted from MS/SU 1 by R-Fch 14 is input to the decoding unit 26, and data transmitted by R-Sch is input to the decoding unit 28. The decoding units 26 and 28 decode the input data, and output the decoded data to CRC (Cyclic Redundancy Check) judgment units 25 and 27 respectively.

The CRC judgment units 25 and 27 inspect the CRC of each decoded data which was received via R-Fch 14 and R-Sch 15 from the decoding units 26 and 28 respectively in frame units, and judge whether or not the communication data in frames have errors (frame errors) based on the inspected CRC. CRC judgment units 25 and 27 output each judgment result, along with each decoded data, to the FER measurement units 31 and 32 of BSC 3 via R-Fch 18 and R-Sch 19 respectively.

FER measurement unit 31 measures the frame error rate (FER) of R-Fch 14 based on the judgment result of the CRC judgment unit 25. Here the frames of the predetermined length L1 exist in R-Fch 14, as described above. Therefore the FER measurement unit 31 receives a predetermined number (number of received frames) N of frames at a predetermined measurement period T. For example, when measurement period T=2 [sec] and frame length L1=20 [msec], the FER measurement unit 31 receives N=2÷0.02= 100 [units] of frames in every measurement cycle T=2 [sec].

Based on the judgment result of the CRC judgment unit 25, the FER measurement unit 31 counts the number M of the frames having frame errors (hereafter "NG frame") (number of NG frames) included in the number N of received frames, and measures FER by the formula $$FER=M \div N \quad (1)$$

In the FER measurement unit 31, a target FER value (e.g. 1%) has been set in advance. The FER measurement unit 31 compares the FER determined by formula (1) and the target FER value. If FER is greater than the target FER value as a result of comparison, the FER measurement unit 31 transmits an instruction to increase the target power threshold value $P_T$ via F-Fch 16. If FER is smaller than the target FER value, the FER measurement unit 31 transmits an instruction to decrease the target power threshold value $P_T$ to the target power setting unit 23 via F-Fch 16. If the FER is equal to the target FER value, then no instruction to increase/decrease the target power threshold value $P_T$ is transmitted, or an instruction to maintain the target power threshold value $P_T$ at the current value is transmitted to the target power setting unit 23.

In R-Sch 15, on the other hand, one or more frames are generated when data (packet data) is transmitted, however no frames are generated when data (packet data) is not transmitted. Therefore the number N of frames received by the FER measurement unit 32 within a measurement period T is not constant. The FER measurement unit 32 is configured to control an increase/decrease of the target power threshold value according to the number N of (hereinafter referred as "the received frame number N") so that the accuracy of power control does not drop even when the received frame number N is not constant.

For example, the threshold value of the number M of NG frames (NG threshold value) to be the criterion of the increase/decrease of the target power threshold value is set in the FER measurement unit 32 according to the number of received frames N. FIGS. 3A and 3B show tables of the relationship between the received frame number N of and the NG threshold value. FIG. 3A is a table showing a general relationship between the number of received frames N and the NG threshold value, and FIG. 3B is a table based on concrete numeric values.

Here the "received frame number N" means the number of frames received in the measurement period T, as described above. The "NG threshold value" means a threshold value to be compared with the number M of NG frames included in the received frame number N. It is preferable that the measurement period T of the FER measurement unit 32 synchronizes with that of the FER measurement unit 31.

When the number M of NG frames is greater than the NG threshold value, an instruction to increase the target power threshold value $P_T$ is transmitted, and when the number M of NG frames is smaller than the NG threshold value, an instruction to decrease the target power threshold value $P_T$ is transmitted to the target power setting unit 23 respectively. If both values are the same, an instruction to increase/decrease is not transmitted, or an instruction to maintain the target power threshold value $P_T$ to the current value is transmitted.

No frames may be received at all within the measurement period T. In this case, the FER measurement unit 32 does not transmit an instruction to increase/decrease, or transmits an instruction to maintain the target power threshold value $P_T$ at the current value to the target power setting unit 23.

FIG. 3A shows that the NG threshold value is set to Th1 when $0<N \leq N1$, and the NG threshold value is set to Th2 when $N1<N \leq N2$, for example. As an example of FIG. 3A, FIG. 3B shows the case when a frame length L2=20 [msec], measurement period T=2 [sec], and the target FER value for each range of the received frame number N is set to 5% (constant) of the maximum value of received frames in each range. If $N \leq 20$ during the measurement period T=2 [sec], for example, the NG threshold value thereof is set to 1, which is 5% of the maximum value (=20) of the received frame number N. In the same way, if $20<N \leq 40$, then the NG threshold value thereof is set to 2, that is, 5% of the maximum value (=40) of the received frame number N.

Clearly the target FER values in respective ranges may not be constant but may be different values. For example, it is possible to be 5% for $0<N \leq 20$, 4% for $20<N \leq 40$, and 3% for $40<N \leq 60$. The range of the received frame number N need not be 20 units, but may be a different number of units in each range. These specific values of the target FER value and the number of units in each range are determined to be values whereby appropriate power control can be performed, on the basis of experiment, simulation and/or actual operation. The relationship between the received frame number N and the NG threshold value can be held as the table shown in FIG. 3B, or can be held as a functional formula so that the NG threshold value according to the number of received frames is determined by this functional formula.

Figure 4:
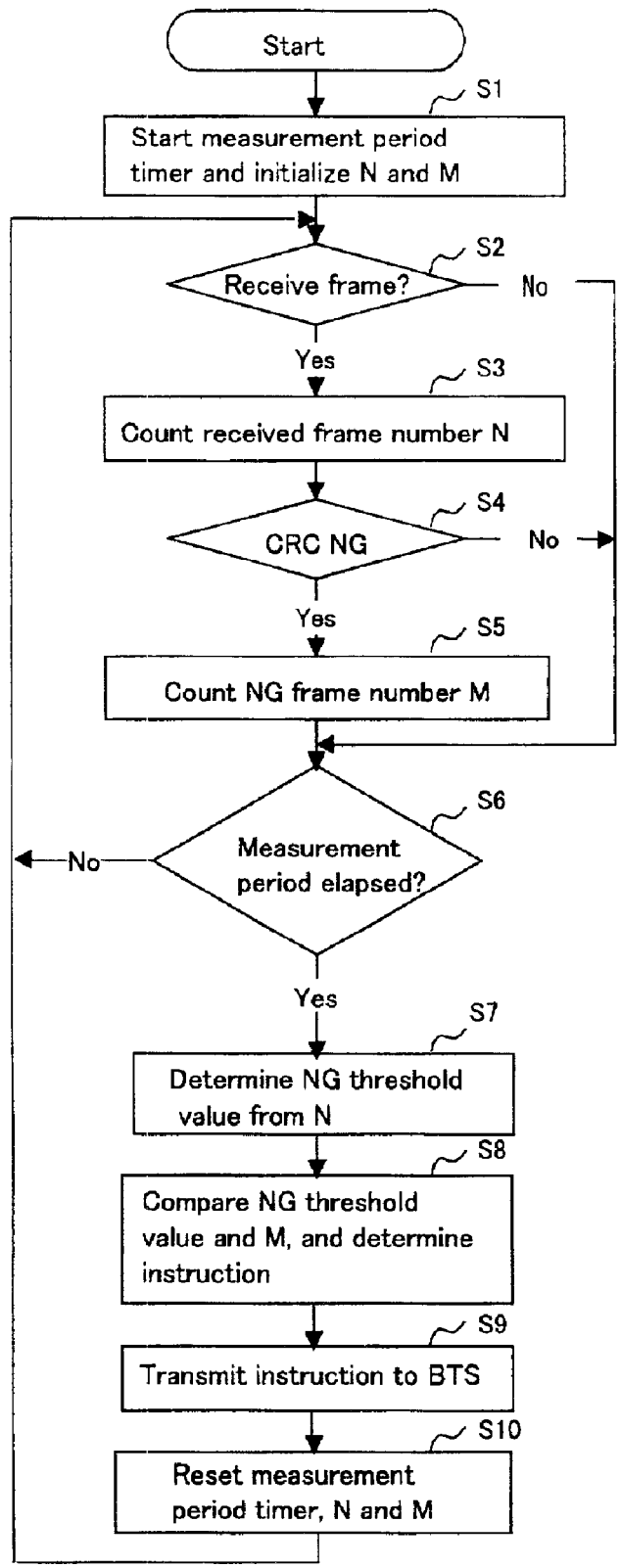
FIG. 4 is a flow chart depicting a processing flow of the FER measurement unit.

FIG. 4 is a flow chart depicting a processing flow of the FER measurement unit 32.

When BSC 3 is started up, the timer (measurement period timer) for measuring the measurement period T provided in the FER measurement unit 32 starts, and both the received frame number N and the number M of NG frames are initialized to zero (Step S1).

Then it is judged whether a frame from the CRC judgment unit 37 is received (Step S2). When a frame is received ("Yes" in Step S2), the received frame number N is incremented by 1 (Step S3), and processing advances to Step S4. When a frame is not received ("No" in Step S2), the received frame number N is not incremented, and the processing advances to Step S6.

In Step S4, it is judged whether the received frame is a NG frame based on the judgment result of the CRC judgment unit 27. When the received frame is a NG frame ("Yes" in Step S4), the NG frame number M is incremented by 1 (Step S5), then the processing advances to Step S6. When the received frame is not a NG frame ("NO" in Step S4), the NG frame number M is not incremented, and the processing advances to Step S6.

In Step S6, it is judged whether the measurement period T has elapsed based on the measurement period timer. If the measurement period T=2 [sec], for example, it is judged whether the measurement period time reached 2 sec. If the measurement period has not been elapsed ("No" in Step S6), the processing returns to Step S2, and the above mentioned processing from S2 to S5 is repeated. If the measurement period T has been elapsed ("Yes" in Step S6), then an NG threshold value corresponding to the received frame number N is selected from the table shown in FIG. 3A or FIG. 3B (Step S7).

Then the NG frame number M and the selected NG threshold value are compared (Step S8). If the NG frame number M is greater than the NG threshold value, an instruction to increase the target power threshold value $P_T$ is transmitted, whereas if the NG frame number M is smaller than the NG threshold value, an instruction to decrease the target power threshold value $P_T$ is transmitted to the target power setting unit 23 respectively (Step S9). When the NG frame number M is equal to the NG threshold value, no instruction is transmitted or an instruction to maintain the target power threshold value $P_T$ at the current value is transmitted (Step S9).

Then the measurement period timer is reset to zero. Also both the received frame number N and the NG frame number M are reset to zero (Step S10). Then the processing returns to Step S2 and the above mentioned processing is repeated.

Since the received frame number N is not constant in Sch, the power control according to the received frame number N can be performed by determining the NG threshold value for each received frame number N and determining the increase/decrease of the target power threshold value, so power control can be performed more accurately, precisely and carefully.

In FIG. 1, the target power setting unit 23 of BTS 2 changes the target power threshold value $P_T$ (increase/decrease (UP/DOWN)), which is set in the receive power measurement unit 24 according to an instruction from the FER measurement units 31 and 32 of BSC 3. There are two ways to change the target power threshold value $P_T$. The first method is changing the target power threshold value $P_T$ such that both the communication quality of R-Fch 14 and R-Sch 15 are satisfied. The second method is changing the target power threshold value $P_T$ such that the communication quality of either R-Fch 14 or R-Sch 15 is satisfied.

First Method

FIG. 5 is a table showing an example of changing the target power threshold value $P_T$ based on the first method.

When at least one of an instruction from the FER measurement unit 31 for Fch and an instruction from the FER measurement unit 32 for Sch is "increase", the target power setting unit 23 increases the target power threshold value $P_T$. When both of the instructions from the FER measurement units 31 and 32 are "decrease", the target power setting unit 23 decreases the target power threshold value $P_T$.

The amount of increase of the target power threshold value $P_T$ by an "increase" instruction and the amount of decrease thereof by a "decrease" instruction have been set in advance in the target power setting unit 23.

By changing the target power threshold value $P_T$ like this, power control can be performed such that the communication quality of both channels can be satisfied.

Second Method

In the second method, the target power setting unit 23 changes the target power threshold value $P_T$ according to either an instruction from the FER measurement unit 31 for Fch or an instruction from the FER measurement unit 32 for Sch. In the case of satisfying the communication quality of R-Fch 14, an instruction from the FER measurement unit 31 for Fch is executed, and an instruction from the FER measurement unit 32 for Sch is not considered. In the case of satisfying the communication quality of R-Sch 15, an instruction from the FER measurement unit 32 for Sch is executed, and an instruction from the FER measurement unit 31 for Fch is not considered. Packet data of R-Sch 15, for example, can be handled by resending even if the communication quality is poor and the data has many errors, but when priority is assigned to the communication quality of control data or voice (audio) data, an approach to satisfy the quality of R-Fch 14 will be taken.

By this handling, power control is performed such that the communication quality of either one of the channels is satisfied.

When the target power threshold value $P_T$ is changed, the receive power measurement unit 24 performs the above mentioned closed loop power control based on the changed target power threshold value $P_T$.

Since FER measurement units 31 and 32 receive frames in succession during communication, such a target power threshold value is changed in every measurement period T if required. Therefore outer loop power control is repeated in every measurement period T.

Outer loop power control of the transmission power of F-Fch 11 and F-Sch 12, as well, is performed in the same way by the decoding units 51 and 52 which perform the same processing as the decoding units 26 and 28, CRC judgment units 53 and 54 which perform the same processing as the CRC judgment units 25 and 27, FER measurement unit 55 which performs the same processing as the FER measurement unit 31, FER measurement unit 56 which performs the same processing as the FER measurement unit 32, and the target power setting unit 57 which performs the same processing as the target power setting unit 23.

When reverse direction R-DCch is also considered for outer loop power control, a decoding unit, CRC judgment unit and FER measurement unit (which performs the same processing as the FER measurement unit 32) for DCch are disposed, and an instruction for this FER measurement unit is assigned to the target power setting unit 23. The target power setting unit 23 integrates instructions from the three FER measurement units, and changes the target power threshold value $P_T$ by the above mentioned first or second method.

Processing when Sch is Not Set

Figure 6:
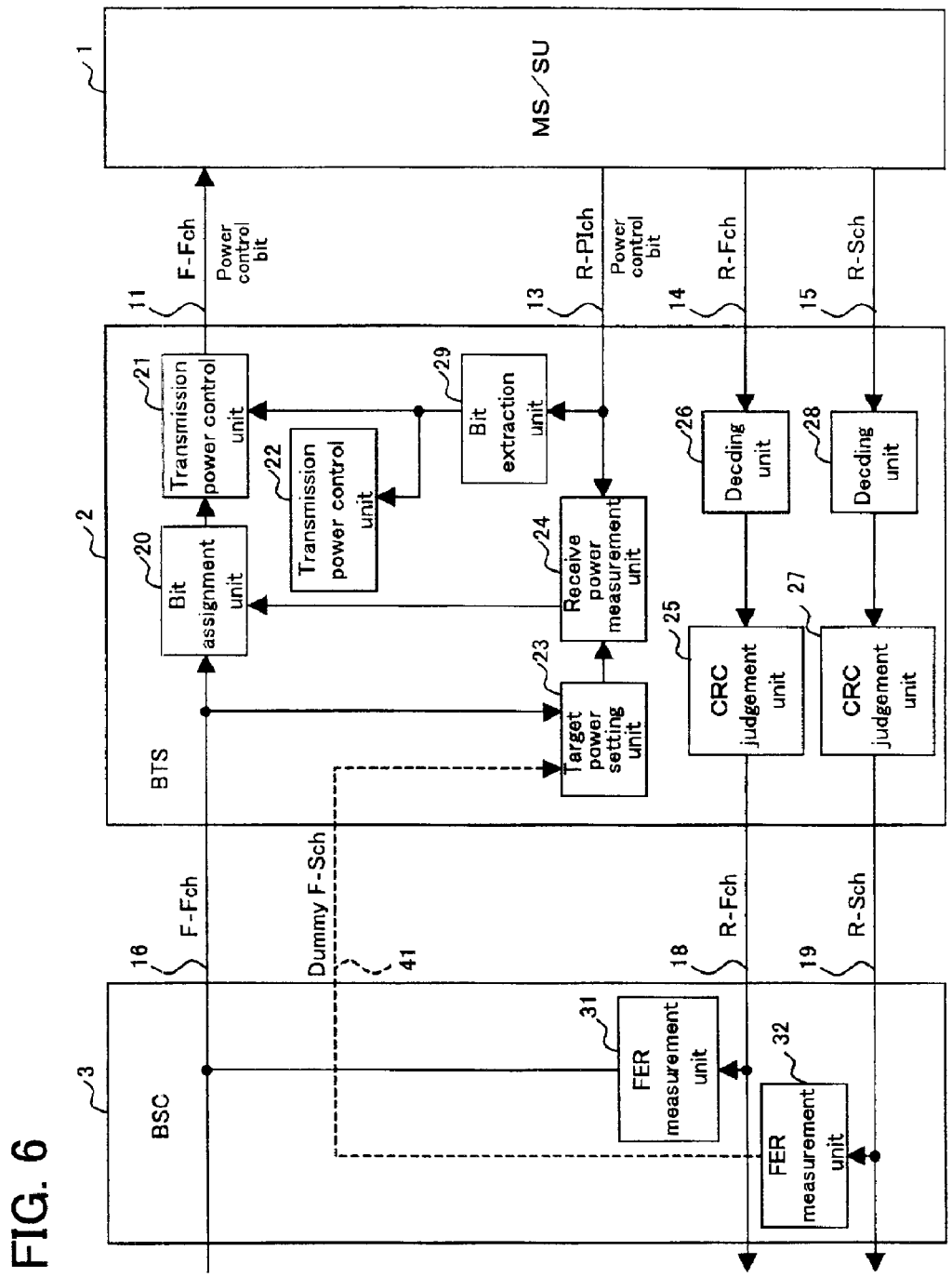
FIG. 6 shows the case when F-Sch is not set between BTS and MS/SU in the mobile communication system shown in FIG. 1 whereas R-Sch is set between them.

Sch is used for communicating relatively fast packet data, as described above. Therefore when MS/SU 1 communicates only voice data by Fch, Sch is not set. For example, FIG. 6 shows the case when F-Sch (F-Sch 12 in FIG. 1) is not set between BTS 2 and MS/SU 1 in the mobile communication system shown in FIG. 1 whereas R-Sch is set between them. In FIG. 6, composing units the same as FIG. 1 are denoted with the same number for which description is omitted.

In this case, a dummy F-Sch 41 in the forward direction is set between BSC 3 and BTS 2. This dummy F-Sch 41 is set for transmitting an instruction of the FER measurement unit 32 to the target power setting unit 23, and not for carrying data (user data) to be transmitted to MS/SU 1. Therefore the dummy F-Sch 41 is set only between BSC 3 and BTS 2, and is not set between BTS 2 and MS/SU 1.

The target power setting unit 23 changes the target power threshold value $P_T$ in the receive power measurement unit 24 according to each instruction transmitted via the F-Fch 16 and the dummy F-Sch 41.

In MS/SU 1, on the other hand, the target power setting unit 57 (see FIG. 2) changes the target power threshold value only according to an instruction by the FER measurement unit 55 for Fch, without considering an instruction from the FER measurement unit 56 for Sch.

Also F-Sch (F-Sch 12 in FIG. 1), which is not descibed in FIG. 6, is set between BTS 2 and MS/SU 1, and R-Sch (R-Sch 15 in FIG. 1) may not be set. In this case, the target power setting unit 23 changes the target power threshold value only according to an instruction from the FER measurement unit 31 for Fch, without considering an instruction from the FER measurement unit 32 for Sch. In MS/SU 1, since the FER measurement unit 56 and the target power setting unit 57 are in the same device, a dummy Sch need not be set.

When neither R-Sch nor F-Sch is set between BTS 2 and MS/SU 1, power control can be performed both by setting a dummy F-Sch and by the target power setting unit 23 and 57, not considering instructions from the FER measurement units 32 and 56.

In this way, even when Sch is not set, power control can be performed by setting a dummy Sch or by not considering an instruction from the FER measurement unit for Sch.

When the FER measurement unit 32 is provided in BTS 2, a dummy Sch need not be set.

[Second Embodiment]

It is possible to substitute the NG threshold value of the table in FIG. 3 to be set in at least one of the FER measurement units 32 (see FIG. 1) and 56 (see FIG. 2) in the first embodiment with a target FER value.

FIGS. 7A and 7B are tables showing the relationship between the received frame number N and the target FER value. FIG. 7A is a table showing a general relationship between the received frame number N and a target FER value. FIG. 7B is a table based on concrete numeric values. The target FER value is set for each range of the received frame number N. The target FER value corresponding to each range may be different, as shown in FIG. 7B, or may be a same value. Concrete values are determined by experiment, simulation and/or actual operation, just like the case of an NG threshold value.

The FER measurement unit 32 (56) performs processing similar to the processing shown in the flow chart in FIG. 4, but there are processing differences in Steps S7 and S8.

In other words, in Step S7, the target FER value corresponding to the received frame number N is selected. When the received frame number N is 20 or less, for example, the target FER value is 5%, and the number of received frames N is greater than 20 and 40 or less, the target FER value is 4%. In Step S8, FER is calculated by the above mentioned calculation formula (1), and the calculated FER and selected target FER are compared. And if FER is greater than the target FER, an instruction to increase the target power threshold value $P_T$ is transmitted, and if FER is smaller than the target FER, an instruction to decrease the target power threshold value $P_T$ is transmitted to the target power setting unit 23 respectively. If both values are the same, no instruction is transmitted or an instruction to maintain the target power threshold value $P_T$ at the current value is transmitted.

By such power control, power control can be performed more accurately, precisely and carefully.

[Third Embodiment]

It is possible to configure the table shown in FIG. 3, which is set in at least one of the FER measurement units 32 and 56 in the first embodiment, as a table where a plurality of NG threshold values are set, such as the table shown in FIGS. 8A and 8B.

FIGS. 8A and 8B are tables showing the relationship of the received frame number N, NG threshold value, and the increase amount (UP amount) and decrease amount (DOWN amount) of the target power threshold value when two or three NG threshold values are set. FIG. 8A is a table showing a general relationship, and FIG. 8B is a table based on concrete numeric values.

In FIG. 8A, if the NG frame number M is equal to or less than NG threshold value M11 when $0<N \leq N1$, then the UP/DOWN amount A of the target power threshold value $P_T$ is selected. If the NG frame number M is greater than the NG threshold value M11 and is equal to or less than M12, then the UP/DOWN amount B of the target power threshold value $P_T$ is selected. For the concrete values of the UP/DOWN amount, as shown in FIG. 8B, "Down large" which is an instruction to decrease the target power threshold value $P_T$ a relative large amount, "Down small" which is an instruction to decrease the value $P_T$ a relatively small amount, "UP small" which is an instruction to increase the value $P_T$ a relatively small amount, and "UP large" which is an instruction to increase the value $P_T$ a relatively large amount, can be set. And the selected instruction is transmitted to the target power setting unit 23.

In the target power setting unit 23, the target power threshold value $P_T$ can be changed by the first method or the second method described in the first embodiment. To make a change by the first method, an "increase" shown in FIG. 5, can be "UP large" or "UP small" according to the instruction from the FER measurement unit 32 (56). In the same way, a "decrease" can be "DOWN large" or "DOWN small".

The same is also possible when the second method is selected and the target power threshold value $P_T$ is changed according to only an instruction from the FER measurement unit 32 (56) for Sch.

The amount of change, for changing the target power threshold value $P_T$ with respect to each one of these instructions, has been set in advance in the target power setting unit 23 (57). And the target power setting unit 23 changes the target power threshold value $P_T$, which is set in the receive power measurement unit, for this amount of change.

By this, transmission power can be controlled more carefully, and transmission power can be followed up even when the communication status changes suddenly.

[Fourth Embodiment]

The measurement period T of the FER measurement units 31 and 32 can be changed according to the target FER value. For example, the measurement period T can be determined by $$T=[\text{measurement period unit}]\div[\text{target FER value [\%]}] \quad (2),$$

or $$T=[\text{length of frame [sec]}]\div[\text{target FER value}] \quad (3).$$

"Measurement period unit" is the time required to receive 100 frames when the target FER value is 1%. Since the lengths L1 and L2 of one frame are 20 [msec], for example, in a cdma2000 system, a "measurement period unit" is 20 [msec]×100 =2 [sec].

For example, when the target FER value is 2% in a cdma2000 system, the measurement period T=2÷2=1 [sec] based on the formula (2). Or the measurement period T can also be determined by T=20 [msec]÷0.02 (2%)=1 [sec] based on the formula (3).

The FER measurement unit transmits an instruction to decrease the target power threshold value to the target power setting unit if there is no NG frames in the measurement period T, and an instruction to increase the target power threshold value is transmitted if there is one or more NG frame(s).

By decreasing the measurement period according to the target FER value like this, the time interval of outer loop power control can be decreased. As a result, a change of the transmission power can be quickly handled, and the response of the power control can be quicker.

The same change is possible for the measurement period of the FER measurement units 55 and 56.

[Other Embodiments]

In the above mentioned embodiments, an example of providing the FER measurement units 31 and 32 in BSC 3 was used, as shown in FIG. 1, but at least one of the FER measurement units 31 and 32 may be provided in BTS 2.

The present embodiments showed an example when the power control of R-Fch and R-Sch (and R-PIch) in the reverse direction was performed all at once by one target power threshold value and one power control bit. This is because in a cdma2000 system, each transmission power of R-Fch, R-Sch and R-PIch are in a proportional relationship, and such control as increasing the transmission power of a channel and decreasing the transmission power of another channel is impossible. Therefore, if the transmission power of each channel can be individually controlled (e.g. F-Fch and F-Sch in the forward direction), then the transmission power of each channel can be individually controlled (closed loop power control and outer loop power control) by setting an independent receive power measurement unit channel, independent target power threshold value and independent power control bit for each channel.

According to the present invention, power control according to the number N of received communication units can be performed even when communication units change depending on the measurement period, just like the case of a channel for transmitting such discrete data as packet data. Also by setting the criteria value to be a criteria to change the target power threshold value to be an appropriate value according to the number N of received communication units, transmission power can be controlled appropriately even if the number N changes.

What is claimed is:

1. A power control device far controlling transmission power of a signal to be transmitted via a radio channel which is set between a mobile station and a base station which communicates with the mobile station by adjusting a target power value to be a target of said transmission power, comprising:

an error judgment unit for receiving frames, and judging whether or not communication data has an error in each frames; and a target power control unit for measuring in each predetermined measurement period a number N of said received frames and a number M of frames which are judged as error by said error judgment unit, and changing said target power value based an a criterion value and said number M, or said criterion value and said numbers N and M, said criterion value being a criterion of change of said target power value and being determined according to said number N.

2. The power control device according to claim 1, wherein said criterion value is a threshold value compared with said number M, and said target power control unit controls said target power value to increase if said number M is greater than said threshold value, and controls said target power value to decrease if said number M is smaller than said threshold value.

3. The power control device according to claim 2, wherein a plurality of said threshold values are provided for each value of the number N; and said target power control unit has values to indicate the amount of change of said target power value corresponding to said plurality of threshold values respectively determines a threshold value corresponding to said number M among said plurality of threshold values, and changes said target power value according to said value to indicate the amount of change corresponding to said determined threshold value.

4. The power control unit according to claim 1, wherein said criterion value is a target error rate to indicate the target value of the ratio of the frames which are judged as error out of the received frames; and said target power control unit compares the error rate when the number M is divided by the number N with said target error rate, controls said target power value to increase when said error rate is greater than said target error rate, and controls said target power value to decrease when said error rare is smaller than said target error rate.

5. The power control device according to claim 1, further comprising a power control unit for controlling said transmission power so that said transmission power becomes or approaches said target power value.

6. A power control device for controlling transmission power of a signal to be transmitted via a radio channel which is set between a mobile station and a base station which communicates with said mobile station by adjusting a target power value to be the target of said transmission power, comprising:

an error judgment unit for receiving frames and judging whether or not communication data has an error in each frame; and a target power control unit for measurement the number of frames judged as error by said error judgment unit in each measurement period, and controlling said target power value to increase when said number is one or more and to decrease when said number is 0, said measurement period being defined as a value obtained by dividing a value of the length of said frame represented by time by a target error rate, said target error rate indicating a target value of a ratio of the frames judged as error by said error judgment unit out of the received frames.

7. The power control device according to claim 6, further comprising a power control unit for controlling said transmission power so that said transmission power becomes or approaches said target power value.

8. A power control device for controlling transmission power of a signal to be transmitted via a radio channel which is set between a mobile station and a base station which communicates with the mobile station by adjusting a target power value to be a target of said transmission power, comprising:

a first error judgment unit for receiving frames on a first radio channel where frames are continuously generated and transmitted on the channel after setting the channel, and judging whether or not communication data has an error for each frame;

a second error judgment unit for receiving frames on a second radio channel where frames are generated and transmitted on the channel when there is communication data after setting the channel, and judging whether or not said communication data has an error in each frame;

a first change instruction unit for measuring a number M1 of frames judged as error by the first error judgment unit in each predetermined measurement period, and generating an instruction to change said target power value based on the number M1 and a predetermined first criterion value to be the criterion of changing said target power value;

a second change instruction unit for measuring a number N2 of received via said second channel and a number M2 of frames which are judged as error by said second error judgment unit in each measurement period, and generating an instruction to change said target power value based on a second criterion value and the number M2, or said second value and the number N2 and M2, said second criterion value being a criterion of changing said target power value and being determined according to the number N2; and a target power setting unit for changing said target power based on the instruction of said first change instruction unit and the instruction of said second change instruction unit.

9. The power control device according to claim 8, wherein
said instruction of said first change instruction unit and said instruction of said second change instruction unit each are either an instruction to increase or an instruction to decrease said target power value; and
said target power setting unit increases said target power value if at least one of said instructions of said first change instruction unit and said second change instruction unit is an instruction to increase, and decreases said target power value if both of said instructions are instructions to decrease.

10. The power control device according to claim 8, wherein said target power setting unit changes said target power value according to said instruction of either said first change instruction unit or said second change instruction unit.

11. The power control device according to claim 8, wherein
said first radio channel and said second radio channel are radio channels for transmitting communication data from said mobile station to said base station;
said first error judgment unit, said second error judgment unit and said target power setting unit are disposed in said base station;
said first change instruction unit and said second change instruction unit are disposed in a base station control unit which communicates with said base station;
the judgment result of said first error judgment unit and communication data of said first radio channel are transmitted to said first change instruction unit via a third communication channel which is set between said base station and said base station control unit when said first radio channel is set;
the judgment result of said second error judgment unit and communication data of said second radio channel are transmitted to said second change instruction unit via a fourth channel which is set between said base station and said base station control unit when said second radio channel is set;
the instruction from said first change instruction unit is transmitted to said target power setting unit via a seventh channel which is set between said base station and said base station control unit when a fifth radio channel for transmitting communication data from said base station to said mobile station is set; and
the instruction from said second change instruction unit is transmitted to said target power setting unit via an eighth channel which is set between said base station and said base station control unit when a sixth radio channel for transmitting communication data from said base station to said mobile station is set.

12. The power control device according to claim 11, wherein said second change instruction unit sets said eighth communication channel even when said sixth radio channel is not set, and transmits said instruction to said target power setting unit via said eighth channel.

13. The power control device according to claim 11, wherein said target power setting unit changes said target power based on an instruction from said first change instruction unit without considering an instruction from said second change instruction unit when said second radio channel is not set.

14. The power control device according to claim 8, wherein
said first radio channel and said second radio channel are radio channels for transmitting communication data from said mobile station to said base station; and
said first and second error judgment units, said first and second change instruction units, and said target power setting unit are disposed in said base station.

15. The power control device according to claim 8, wherein
said first radio channel and said second radio channel are radio channels for transmitting communication data from said base station to said mobile station; and
said first and second error judgment units, said first and second change instruction units, and said target power setting unit are disposed in said mobile station.

16. The power control device according to claim 8, further comprising a power control unit for controlling said transmission power so that the transmission power of said first and second radio channels becomes or approaches said target power value.

17. A power control method for controlling transmission power of a signal to be transmitted via a radio channel which is set between a mobile station and a base station which communicates with the mobile station by adjusting a target power value to be a target of said transmission power, comprising the steps of:

receiving frames;

judging whether or not a communication data has an error in each frame;

measuring a number N of said received frames and a number M of frame which are judged as error by said judging in each predetermined measurement period; and changing said target power value based on a criterion value and said number N, or criterion value and said numbers N and M, said criterion value being a criterion of change of said target power value and being determined according to said number N.

18. A power control method of controlling transmission power of a signal to be transmitted via a radio channel which is set between a mobile station and a base station which communicates with said mobile station by adjusting a target power value to be a target of said transmission power, comprising the steps of:

receiving frames on a first radio channel, which each have a predetermined length, are continuously generated and transmitted on the channel after setting the channel, and performing a first error judgment which judges whether or not communication data has an error in each frame;

receiving frames on a second radio channel which frames are generated and transmitted on the channel when there is communication data after setting the channel, and performing a second error judgment which judges whether or not said communication data has an error in each frame;

measuring, in each predetermined measurement period, a number M1 of frames judged as error by said first error judgment, and generating a first instruction to change said target power value based on said number M1 and a predetermined first criterion value to be the criterion of changing said target power value;

measuring, in each measurement period, a number N2 of frames received via said second channel and a number M2 of frames which are judged as error by said second error judgment, and generating a second instruction to change said target power value based on a second criterion value and the number M2, or said second criterion value and said numbers N2 and M2, said second criterion value being a criteria of changing said target power value and being determined according to the number N2; and changing said target power based on said first and second instructions.

* * * * *